US006775283B1

(12) United States Patent
Williams

(10) Patent No.: US 6,775,283 B1
(45) Date of Patent: Aug. 10, 2004

(54) PASSING VLAN INFORMATION THROUGH DESCRIPTORS

(75) Inventor: Robert Alan Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,663

(22) Filed: Jan. 5, 2000

Related U.S. Application Data

(60) Provisional application No. 60/165,768, filed on Nov. 16, 1999.

(51) Int. Cl.[7] .......................... H04L 12/56; H04L 12/66
(52) U.S. Cl. ....................................... 370/392; 370/463
(58) Field of Search ................................ 370/389, 392, 370/419, 420, 428, 429, 463, 395.1, 395.5, 395.53, 395.54, 400, 401, 409, 412; 709/249, 250

(56) References Cited

U.S. PATENT DOCUMENTS

| | | | |
|---|---|---|---|
| 5,905,870 A | | 5/1999 | Mangin et al. |
| 5,920,566 A | * | 7/1999 | Hendel et al. ............... 370/401 |
| 5,978,378 A | * | 11/1999 | Van Seters et al. ......... 370/401 |
| 5,991,299 A | * | 11/1999 | Radogna et al. ............ 370/392 |
| 6,067,300 A | * | 5/2000 | Baumert et al. ............ 370/413 |
| 6,128,666 A | * | 10/2000 | Muller et al. ............... 709/238 |
| 6,157,623 A | * | 12/2000 | Kerstein ...................... 370/315 |
| 6,172,980 B1 | * | 1/2001 | Flanders et al. ............ 370/401 |
| 6,181,699 B1 | * | 1/2001 | Crinion et al. .............. 370/392 |
| 6,185,214 B1 | * | 2/2001 | Schwartz et al. ........... 370/401 |
| 6,256,693 B1 | * | 7/2001 | Platko ........................ 710/105 |
| 6,356,551 B1 | * | 3/2002 | Egbert ........................ 370/389 |
| 6,442,162 B1 | * | 8/2002 | O'Neill et al. .............. 370/389 |
| 6,515,993 B1 | * | 2/2003 | Williams et al. ....... 370/395.53 |

OTHER PUBLICATIONS

Am79C972 PCnet™–FAST+ Hardware User's Manual, Publication No. 22113, Feb. 1998, Advanced Micro Devices, Inc.*
Am79C972 PCnet™–FAST+ Enhanced 10/100 Mbps PCI Ethernet Controller with OnNow Support, Publication No. 21485, Apr. 1999, Advanced Micro Devices, Inc., pp. 1–22.*

* cited by examiner

*Primary Examiner*—Steven Nguyen

(57) ABSTRACT

In a packet switch, such as an Ethernet switch, the network interface cards (NICs) of the switch perform processing functions relating to tags that identify packets or frames for a particular virtual local area network (VLAN) supported by the switch. Descriptors used to process the frames in the buffer memory of the switch provide tag information and tag status indicators and/or tag processing commands. Upon reception of a frame, a NIC recognizes the type of the frame as it relates to VLAN tagging. As the NIC writes the frame to a receive buffer location, it also writes a tag type indicator and any tag information read from the frame into the receive descriptor for that frame. The switch CPU creates a transmit descriptor that includes the pointer to the transmit buffer location in memory, and that descriptor includes a tag control command as well as a tag information field. The command instructs the transmitting NIC to perform any necessary VLAN tag processing, for example, to add, delete, modify or pass tag data in a particular frame. To add a tag, for example, the NIC inserts the VLAN tag information into the frame, as the NIC reads the frame from the transmit buffer for transmission over the media.

20 Claims, 5 Drawing Sheets

PASSING VLAN INFORMATION THROUGH DESCRIPTORS

RELATED APPLICATION

This application claims the benefit of U.S. Provisional Application No. 60/165,768, entitled "PASSING VLAN INFORMATION THROUGH DESCRIPTORS" filed on Nov. 16, 1999 by Robert Alan Williams.

FIELD OF THE INVENTION

The present invention relates to packet network switching and interfacing, and more particularly, to methods and systems for processing data packets for virtual local area network communications.

DESCRIPTION OF THE RELATED ART

Local area networks (LANs) use a network cable or other media to link nodes or stations on the network. With the growing number of data devices common in the modern workplace, many local area network applications entail use of interconnected packet switches. A multiport data network switch conventionally permits data communication among a plurality of nodes or stations linked to the switch by various media in a local area network. Each station in the network is associated with a port of the switch. Data frames, or packets, are transferred between stations by means of data network switch media access control (MAC) circuitry, or "engines," for each switch port. The network switch passes data frames received from a transmitting station to a destination station based on the header information in the received data frame. The switch can link the network to other networks through one or more predesignated switch ports.

One feature of common packet switches for such LAN applications, such as Ethernet switches, is that the switches actually can segregate a network into a number of virtual local area networks (VLANs). In the VLAN mode of operation, the switch(es) of a packet network transport frames or packets back and forth between terminal stations designated as members of a particular VLAN. However, the switch(es) of the network do not transport the packets for the VLAN members to any other terminal stations. In this manner, the capability exists for creating logical workgroups of users and their shared resources (servers, printers, etc.), which may be physically separated from each other. Members of a workgroup may be coupled directly with one switch in the local area network, while other members or equipment of the workgroup may be coupled to one or more remote networks that are linked to the switch at a designated port. VLAN groupings can provide privacy and security to their members while enabling "broadcast domains" whereby broadcast traffic is kept "inside" the VLAN.

Where the switch(es) implement two or more virtual local area networks (VLANs), the switch(es) must distinguish packets for members of one VLAN from packets for members of a different VLAN and from packets for devices not associated with any one VLAN. All VLAN frames may be tagged with data identifying the particular VLANS. Hence, data packets communicating within a VLAN may contain information that identifies the VLAN grouping, or VLAN type, and the particular VLAN ID. Such information, or "tag," is provided as additional fields in the frame header. The frame format for such packets is expanded relative to the standard frame format. For example, the IEEE 802.3ac-1998 supplement to the Ethernet ANSI/IEEE 802.3 standard (1998 Edition) specifies the tagged and untagged frame formats, and the P802.1Q Draft standard specifies the semantics of tagged frames.

In some network implementations, all of the devices including the end nodes of the network may process VLAN tags. However, in many cases, the end nodes on the network do not process VLAN tags. Where all legs of the VLAN are served through one switch, the switch may distinguish the packets simply by receiving and sending packets over the links designated for the respective VLAN, without VLAN tags. However, where the VLANs extend through two or more switches, the frames or packets for each VLAN must be tagged, particularly on the links between switches. Consequently, each switch needs to add, delete and process the VLAN tags.

In conventional Ethernet switches, one NIC in the switch receives a frame from a source, the frame is loaded into a buffer in memory, and another NIC sends the frame from memory over the link to the destination. All NICs in the one switch share common buffer space in memory. To send the frame, the switch logic sends a pointer to the NIC performing the transmit operation, to identify the location of the frame in memory. The memory location is the same as that loaded by the receiving NIC, so that the frame need not be copied from a receive (Rx) buffer to a transmit (Tx) buffer.

When such switches process frames in a VLAN mode, the switch logic has to make certain decisions and perform certain functions in relation to the VLAN tag. In many cases, the switch logic needs to insert, delete or modify a VLAN tag in each affected frame. For example, a tagged packet, received at a VLAN tagged port, may require transmission to a network station coupled to an untagged port. The switch must be capable of stripping the tag information from the frame header at appropriate stages of operation. The switch must also be capable of converting a stripped or untagged frame to tagged format, if the packet is to be transmitted to a VLAN destination via a tagged port.

Conventional Ethernet switches perform the necessary VLAN tag processing in the central logic of the switch. Often, the logic must move data in the buffer memory in order to perform the requisite VLAN tag processing. To insert a tag before transmission, for example, the logic must transfer a first segment of the frame to a new larger buffer location, add the tag bytes at the appropriate position in the larger buffer and then transfer the remainder of the data to the new buffer. A similar transfer also is required to delete a tag while the frame is in memory. This VLAN tag processing burdens the switch logic. The transfers between buffer locations in memory are particularly problematic. The copying of data takes CPU time and thereby reduces performance. Also, the transfers increase the demands for memory space.

SUMMARY OF THE INVENTION

Accordingly, there is a need for a more efficient technique to process VLAN tags within a packet switch.

A more specific need is for a VLAN tag processing technique that eliminates the transfer of data between frame buffers in memory to add, delete or modify tag data.

There is also a specific need is for a VLAN tag processing technique that reduces the processing burden placed on the switch logic.

The present invention addresses these needs and overcomes the noted problems with the prior technology by removing certain VLAN tag processing functions from the central switch logic and performing those processing functions in the NICs. Descriptors of the frames in the buffer memory are modified to provide tag information as well as certain tag processing commands and/or tag status data. For example, the transmit descriptor that includes the pointer to the transmit buffer location in the switch also includes a tag control command and a tag control information field. The command instructs the transmitting NIC as to any necessary VLAN tag processing. In response to a command in the transmit descriptor, for example, the NIC may add, delete, modify or pass tag data in a particular frame. In the case of an add command, as one specific example, the NIC would insert the VLAN tag including the tag control information into the frame, as the NIC reads the frame from the transmit buffer for transmission over the media.

The inventions encompass various methods of processing frames, with regard to VLAN tags, as the frames are processed through a data switch or other host system. Other inventive concepts encompass switches, network interface cards, and controllers for such cards, implementing the inventive VLAN tag processing.

For example, one aspect of the invention relates to a method of processing a frame of data in a switch of a data communication network. The data frame has a header containing address and status information and data. The method entails receiving the frame from a network link in a network interface card in the switch. The network interface card determines tag status of the frame, with regard to a virtual local area network (VLAN) tag that may be contained in the header. The network interface card records the VLAN tag status of the frame in a descriptor, which also contains an address of an available buffer in system memory of the switch. If the frame status indicates that the frame contains a VLAN tag, a VLAN identifier from the VLAN tag in the frame is copied into a predetermined field of the descriptor. The network interface card writes the frame into the system memory of the switch at the location corresponding to the address of the available buffer. It also modifies the descriptor to indicate to the central processor of the switch that the available buffer has been loaded with a frame corresponding to the descriptor. The switch processes the frame from the buffer, based at least in part on the VLAN tag status recorded in the descriptor.

In the preferred embodiments, the frame is an Ethernet frame. The VLAN tag status recorded in the descriptor has a value indicating a type of status, such as tagged, untagged or priority. The tag status information together with any tag data actually read from the frame and placed in the descriptor facilitates decisions and further processing by the switch logic, without the need for the switch CPU to actually read the frame header itself.

For example, the tag related status and tag information in the receive descriptor simplifies the procedure for developing the transmit descriptor for the frame. The CPU develops a transmit descriptor containing the address of the loaded buffer and a VLAN tag command. The transmit descriptor includes a field for VLAN tag information. For example, if the received frame was untagged but must be converted to a tagged frame, the CPU writes an add tag command and the necessary VLAN tag information into the transmit descriptor. The switch CPU forwards the transmit descriptor to another network interface card in the switch, and that network interface card transmits the frame from the loaded buffer. As part of its transmit processing, the second network interface card processes the frame header in accord with the VLAN tag command, for example by adding the VLAN tag information into frame header from the transmit descriptor.

Another inventive aspect involves a method of processing and transmitting a frame. This method entails receiving a descriptor in a network interface card controller of a switch. The descriptor contains an address for a buffer location in system memory of the switch where the frame is stored. The descriptor also contains a VLAN tag control command and a field for VLAN tag control information. The controller reads the frame from the addressed buffer location and transmits the frame over the network link. As part of the reading and transmitting operation, the controller processes a portion of the header of the frame in accord with the tag control command.

In some instances, a NIC sending a frame may simply pass the frame without any modification thereof in regard to the VLAN tags. However, in many cases, the sending NIC may need to add, delete or modify VLAN tag information in the frames.

The preferred embodiment of the present invention utilizes specific formats for the receive descriptor and the transmit descriptor. The receive descriptor includes a control word and a receive buffer address. Either separately or within the control word, the receive descriptor includes a tag status or type indicator. The receive descriptor also includes a field for tag information that may be read from the frame. The preferred tag type indicator signifies whether a received frame is tagged or untagged or is tagged with a priority. The transmit descriptor contains a control word and a transmit buffer address. Either separately or within the control word, the transmit descriptor includes the tag control command. The transmit descriptor also includes a field for tag information, which in this case, may carry tag related data that needs to be added to the header or written over tag data in the header.

The preferred embodiments process frames containing error detection data, for example to enable recognition and correction of errors. If the NIC sending a frame alters the frame header, for example by adding deleting or modifying VLAN tag data, the NIC replaces the original error detection data with new error detection data derived from the altered frame.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout

FIG. 2-1 provides a board level block diagram of the relevant components of an exemplary NIC, for implementing the VLAN tag processing in accord with the present invention.

FIG. 2-2 is a block diagram of a controller of the network interface card shown in FIG. 2-2, for implementing the VLAN tag processing in accord with the present invention.

BEST MODE FOR CARRYING OUT THE INVENTION

Ethernet networks may be implemented through one or more packet switches. Where the switch(es) implement two or more virtual local area networks (VLANs), the switch(es) must distinguish packets for members of one VLAN from packets for members of a different VLAN. Where all legs of the VLAN are served through one switch, the switch may distinguish the packets simply by receiving and sending packets over the links designated for the respective VLAN. However, where the VLANs extend through two or more switches, the frames or packets for each VLAN must be tagged. In accord with the invention, the tag processing functions are performed principally in the network interface cards (NICs) of the switches, and tag related data is passed through the switch in frame or buffer descriptors.

Figure 1:
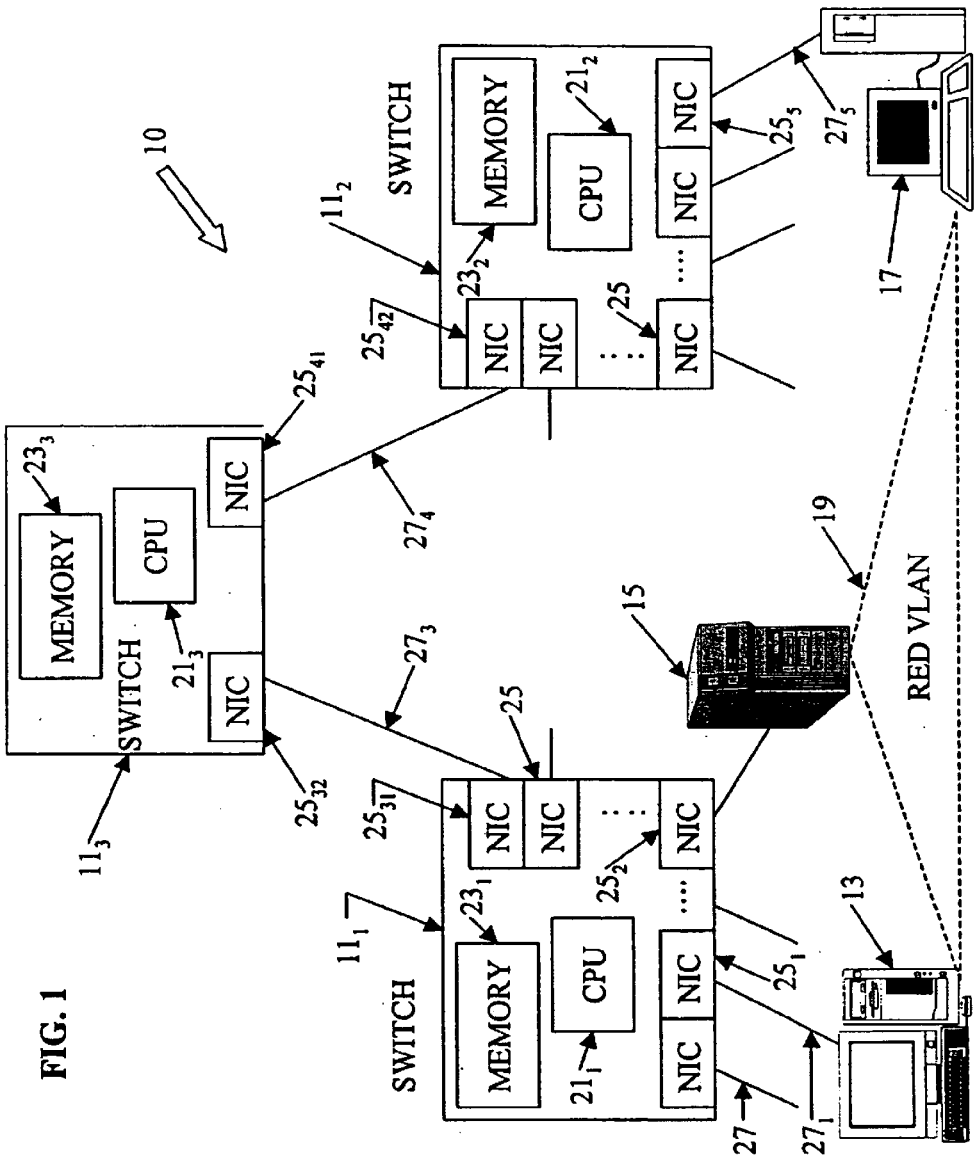
FIG. 1 is a block diagram illustrating an Ethernet network, providing VLAN communications through a number of packet switches.

FIG. 1 is a diagram of an Ethernet (IEEE 802.3) network 10 comprising a number of packet switches 11. In the illustrated example, there are three such switches. The switch 11, serves a number of end-user devices. Examples of such devices include the personal computer 13 and the server 15. The switch $11_2$ also serves enduser devices, represented for example by the personal computer 17. The third switch $11_3$ may also serve end-user devices, but in the illustrated example, the switch $11_3$ serves as a hub, linking the two switches $11_1$ and $11_2$.

In one mode of operation, of particular interest in this discussion, the network 10 can support a number of virtual local area networks (VLANs). Two or more devices coupled to the switches communicate privately with each other via each logically separate VLAN. Other devices coupled to the switches 11 may not be part of any one VLAN. For convenience VLANs often are designated by a color. In the example, one VLAN supported by the network 10 is the RED VLAN 19. The switches 11 provide packet data services between the end-user devices 13, 15, 17 of the VLAN 19, in a manner emulating a private data network between those devices. The switches 11 provide similar virtual private data services over the links designated for any number of other VLANs not shown. Also, the switches may serve any number of additional devices that are not part of any particular VLAN.

In many such implementations, the software in the end user devices does not process VLAN tags, therefore it is necessary for the switches 11 to add, modify and delete VLAN tags, particularly for inter-switch communications described in more detail later. For purposes of further discussion, it is assumed that the end user nodes on the VLANs in the network 10 do not process VLAN tags. Frames on the end legs, going between the switches and the end devices, do not have tags. VLAN frames going between switches need tags.

The drawing illustrates the major functional elements of the three switches 11, which are most relevant to the discussion here, in simplified block diagram form. As shown, each packet switch 11 includes a central processing unit (CPU) 21, a system memory 23 and a number of network interface cards (NICs) 25. The NICs provide the actual interface to the physical media of the links 27 of the network 10. Stated simply, a NIC 25 will receive a packet or frame via a link 27, and the CPU 21 will assign a buffer, and the NIC will store the frame in an assigned buffer location in the memory 23. Based on header information in the frame, the CPU 21 instructs the appropriate NIC 25 coupled to the next link in the path to the intended destination to read the frame from the buffer and send the frame over the particular link 27. Each NIC 25 performs both receive and transmit functions over the respective physical link 27.

Each switch 11 uses frame descriptors to control the transmission and reception functions of the NICs 25. The CPU 21 allocates space for buffers and creates lists of Rx descriptors and Tx descriptors. In both cases, the CPU fills in the address fields with pointers to the buffers and sets a status bit referred to as an "OWN" bit. For the receiver, the switch CPU 21 originally sets all of the OWN status bits in the descriptors to 1, meaning that the buffers are all empty and available to write frame data into memory. The receiving NIC controller owns all of the empty receive buffers. For the transmitter, the CPU sets all of the OWN status bits to 0 meaning that the empty buffers are not available and there is no data to send. The CPU owns all of the empty transmit buffers.

In operation, when a NIC 25 receives a frame, it copies that frame into an assigned buffer location in the memory 23 of the host switch 11, using the receive buffer address (RBADR) from the next descriptor for an available receive buffer. The receiving NIC updates the receive descriptor containing the buffer address, for example by writing appropriate data in fields of the descriptor relating to the VLAN tag. The NIC 25 sets the OWN status bit in the receive descriptor to 0, transferring ownership to the switch CPU 21, when the buffer is filled with a received frame. The CPU 21 reads and interprets the status and VLAN information.

The CPU 21 determines which output NIC(s) need to forward the particular frame. The CPU 21 develops a transmit descriptor now including the address of the buffer as a pointer for a transmit buffer (TBADR). The switch CPU 21 sets the OWN bit of the transmit descriptor to 1 and adds that transmit descriptor to a queue for each NIC 25 identified for forwarding the packet over another link. When a sending NIC 25 reaches the descriptor in its queue, it recognizes that frame is ready to send from the 1 value of the OWN bit in the descriptor. The NIC then retrieves the frame from the addressed location in system memory and sends the frame over the link. In accord with the invention, the transmit descriptors carry VLAN tag information, and the NIC processing in relation to the descriptors also entails VLAN tag processing.

In the simple example shown in FIG. 1, the red VLAN 19 provides virtual private data communications for three devices, the personal computer 13, the server 15 and the personal computer 17. Although not shown, each such device will include a NIC similar to the NICs 25, albeit set to a different operating mode. One such NIC enables the computer 13 to send and receive Ethernet data frames over the link $27_1$ to and from the NIC $25_1$ in the switch $11_1$. Similarly, the server 15 can send and receive Ethernet data frames over the link $27_2$ to and from the NIC $25_2$ in the switch $11_1$. The NIC in the computer 17 enables that device to send and receive Ethernet data frames over the link $27_5$ to and from the NIC $25_5$ in the switch $11_2$.

The VLAN 19 provides communications to the devices 13, 15 and 17 as if they were connected together via a private LAN illustrated by the dotted lines. However, in the configuration shown in the drawings, the devices connect to two different switches and at least some of the VLAN communications actually go through three different switches. On the links to the end user devices, such as the links $27_1$, $27_2$ and $27_5$, the frames need not include VLAN tags. However, on the links between switches 11, such as the links $27_3$ and $27_4$, the frames must be tagged to distinguish the frames from frames relating to other VLANs.

In accord with the invention, NICs carrying any of the VLAN data traffic will perform the necessary VLAN tag information. These NIC will supply tag status information to the switch CPUs in receive descriptors and receive VLAN tag instructions regarding processing during frame transmission in transmit descriptors. In the illustrated example, the NICs $25_1$, $25_2$, $25_5$ serving the links to the end devices will receive untagged frames from the links and signify that tag status to the respective switch CPUs $21_1$, and $21_2$ in the receive descriptors. Those NICs will send untagged frames, in some cases they may pass untagged frames, but in many instances they will need to delete VLAN tags from frames received through inter-switch links, in response to instructions contained in the transmit descriptors.

In the switches $11_1$ and $11_2$, the NICs $25_{31}$, $25_{42}$ coupled to the inter-switch links $27_3$, $27_4$ will transmit and receive tagged frames. When they receive a tagged frame, they will indicate the tagged status and provide the VLAN specific tag information in the receive descriptor. The frames for transmission through each these NICs $25_{31}$, $25_{42}$ often will have been received through other NICs without tags. In such case, the NIC $25_{31}$ or $25_{42}$ transmitting the frame over the inter-switch link $27_3$ or $27_4$ will respond to an instruction and to add the VLAN specific tag information from the transmit descriptor into the frame as it is read from the buffer and transmitted over the respective link.

The NICs $25_{32}$ and $25_{41}$ in the hub switch $11_3$ send and receive tagged frames over the links $27_3$, $27_4$. When either of these NICs receives a frame, it will indicate the tagged status of the frame and write the VLAN specific data into the receive descriptor. During transmission, the CPU $23_3$ may instruct the NIC to modify VLAN tag data, but in most instances, the CPU $23_3$ instructs the NIC $25_{32}$ or $254_1$ to pass the frame without any change regarding VLAN tags.

To fully appreciate the structure and operation of a network implementing the VLAN tag processing in a NIC, as involved in the present invention, it may be helpful to consider the structure of a preferred embodiment of one of the NICs 25. A NIC 25 typically is implemented as a card or printed circuit board for connection within a host device. In the examples shown in FIG. 1, the host devices for the NICs are the switches 11. The preferred embodiment of the NIC 25 also may be used in an end user device, such as a personal computer or server acting as the host, but is set to operate in a different mode for such use.

Figures 1, 2:
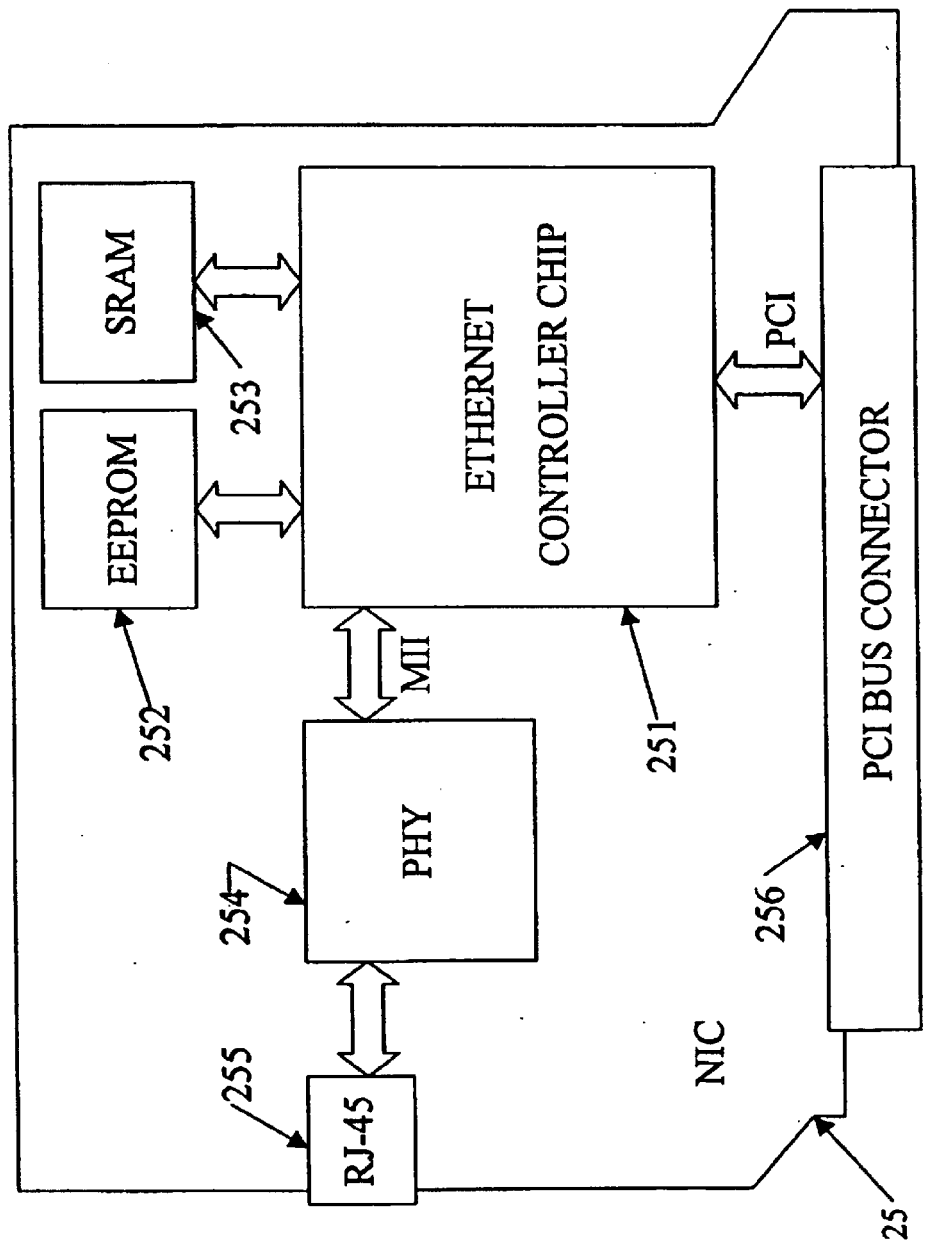
Figure 2:
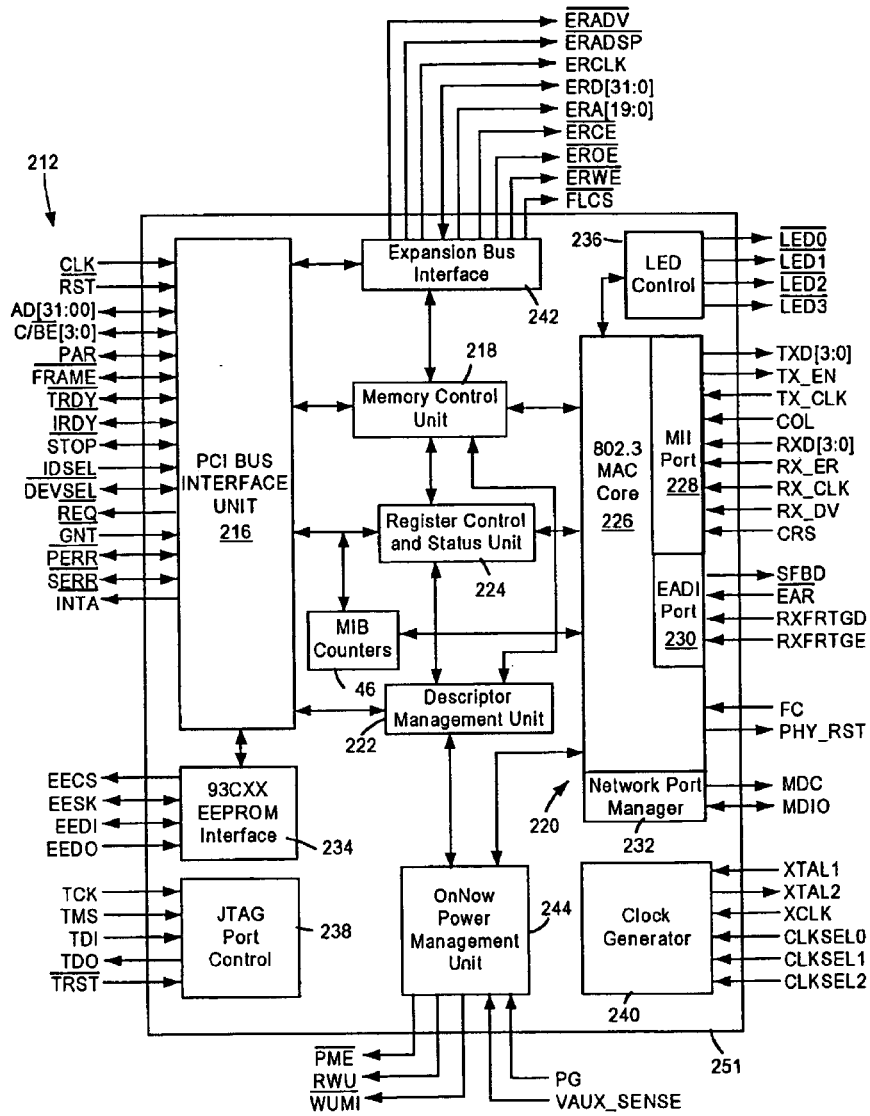

The present invention is described in the context of an IEEE 802.3 compliant network interface configured for sending and receiving data packets between a system memory and a network medium using established Media Access Control (MAC) and Physical Layer (PHY) protocols. FIG. 2-1 provides a board level block diagram of the relevant components of an exemplary NIC 25. Other components for such purposes as status displays, power and oscillator functions, are omitted for ease of illustration and discussion.

As shown, the preferred embodiment of the NIC 25 comprises an Ethernet controller chip 251 and program and data memories in the form of EEPROM 252 and SRAM 253. The SRAM memory 253 may be built into the Ethernet controller chip 251, but preferably is mounted separately on the NIC board and connects to an appropriate memory interface within the Ethernet controller chip 251. The controller chip may include an actual physical interface for connection to the network medium. In the illustrated embodiment, the Ethernet controller chip 251 connects through an MII bus signal path to a separate chip (PHY) 254 embodying the physical layer transceiver coupled to the network media, for example through an RJ-45 connector 255. The preferred embodiment of the controller comprises a single-chip, 32-bit, Ethernet controller with a peripheral component interconnect (PCI) local bus for the host connection, and an MII bus interface for connection to the PHY chip. For purposes of the host connection, the PCI bus interface of the Ethernet controller chip 251 connects to a PCI bus connector 256 mounted along the edge of the NIC card.

FIG. 2-2 depicts the major components of the exemplary Ethernet controller chip, in functional block diagram form.

The network interface controller 251 includes a PCI bus interface unit 216, a memory control unit 218, a network interface portion 220, a descriptor management unit 222 and a register control and status unit 224. The network interface portion 220 includes an IEEE 802.3 compliant and full-duplex capable media access control (MAC) core 226, a Media Independent Interface (MII) port 228 for connecting external 10 Mb/s, 100 Mb/s or 1000 Mb/s transceivers, an External Address Detection Interface (EADI) port 230, and a network port manager unit 232. The network interface controller 251 also includes an EEPROM interface 234 for reading from and writing to an external EEPROM, an LED control 236, an IEEE 1149.1-compliant JTAG Boundary Scan test access port interface 238, a clock generation unit 240, and an expansion bus interface 242. The expansion bus interface unit 242 interfaces to an external memory (SRAM 253 in FIG. 2-1) for frame storage and also to nonvolatile (e.g., EPROM 252 or Flash memory) storage for boot programming used during startup.

The PCI bus interface unit 216, compliant with the PCI local bus specification (revision 2.2), receives data frames from a host computer memory, such as system memory 23, via the PCI bus 212. The PCI bus interface unit 216, under the control of the descriptor management unit 222, receives transfers from the host computer via the PCI bus 212. For example, transmit data received from the PCI bus interface unit 216 is passed to the memory control unit 218 which stores it in the data memory. Subsequently, the memory control unit 218 retrieves the transmit data from the data memory and passes it to the MAC core 226 for eventual transmission to the network. Similarly, receive data from the network is processed by the MAC core 226 and passed to the memory control unit 218 for storage in the data memory. Subsequently, the memory control unit 218 retrieves the receive data from the data memory and passes it to the PCI bus interface unit 216 for transfer to the host computer, in the case the switch logic, via the PCI bus 212.

The descriptor management unit 222 manages the transfers of data to and from the host computer via the PCI bus interface unit 216. Data structures contained in the memory of the host computer or switch specify the size and location of data buffers along with various control and status information. The descriptor management unit 222 interfaces with the memory control unit 218 to insert control information into the transmit data stream and to retrieve status information from the receive data stream.

The network interface portion 220 includes a network port manager 232 that performs auto-negotiation functions by communicating via the media with a corresponding auto-negotiation unit in the link partner (e.g., for a centralized hub, repeater, workstation, or other switch).

Figure 3:
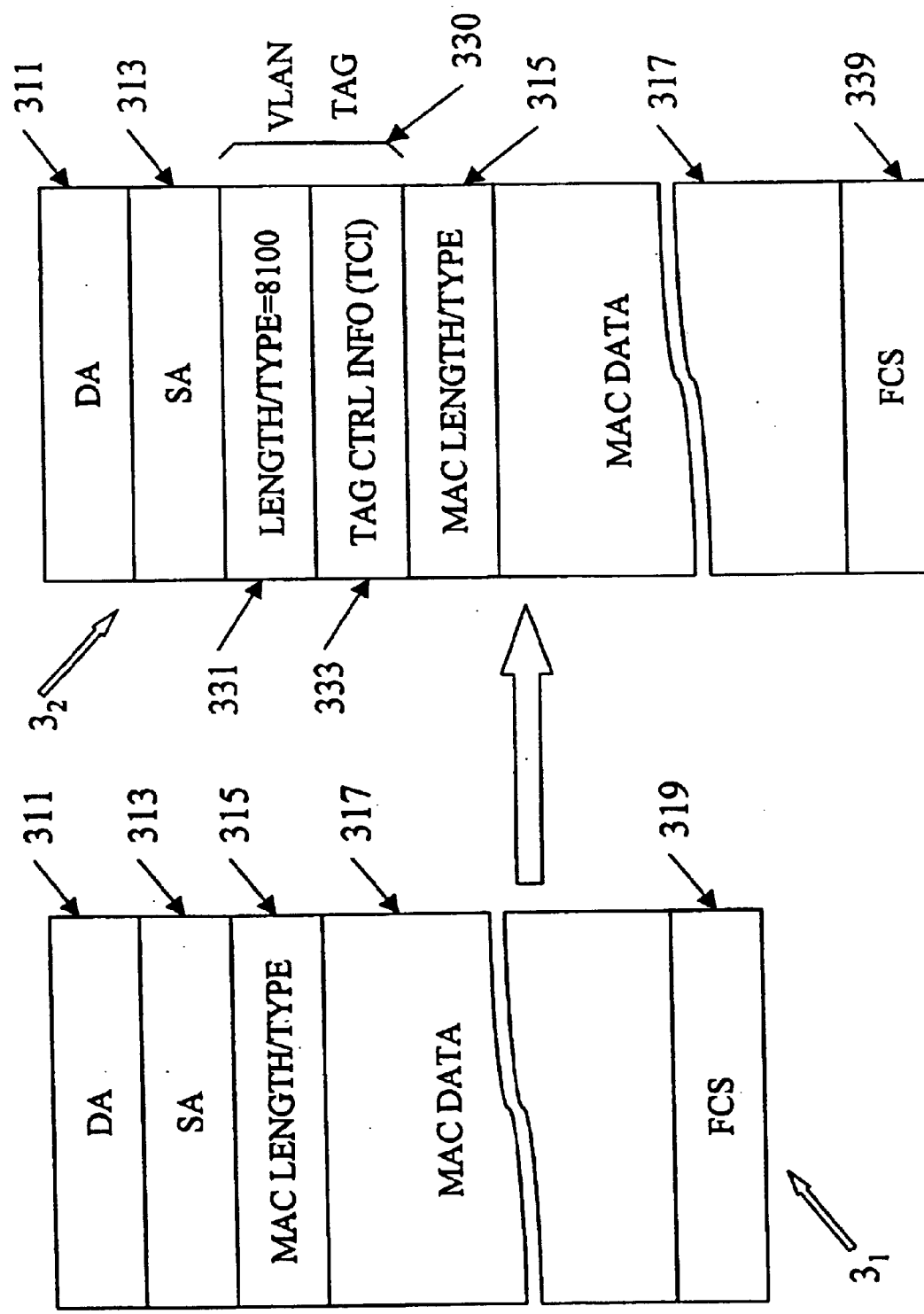
FIG. 3 is a diagram illustrating the format of a frame and the modification thereof to add a VLAN tag during transmission by a NIC, in accord with the invention.

It may also be helpful at this point to consider the frame format, particularly as it relates to VLAN tag processing. All frames include certain header information, usually including various address information and status information, as well as the actual user data. An exemplary network data packet 3 and the VLAN processing during the transmission thereof are shown in FIG. 3.

In this example, assume that initially the frame stored in the transmit buffer in memory is untagged, as shown at $3_1$. The untagged frame $3_1$ includes a 6 byte destination address (DA) field 311, a 6 byte source address (SA) field 313, a 2-byte MAC type/length field 315, a variable length data field 317 of 46 bytes to 1500 bytes, and 4 bytes for a frame check sequence (FCS) field 319.

Each network interface controller (NIC) has a unique media access control (MAC) address. No two controllers can have the same address. The destination address DA represents the MAC address of the NIC in the intended recipient device destined to receive the frame. The source address SA represents the MAC address of the NIC in the device sending the frame. The MAC type/length field 315 originally specified the type of frame although the purpose of this field was modified in later generations to represent the length of the frame. Maximum length of a frame is 1500 bytes. If the value in the field 315 is 1500 or less, it is interpreted as specifying the length of the frame. If the value is greater than 1500, the controllers interpret it as specifying a frame type.

Following the data, the FCS field contains cyclic redundancy check (CRC) data. The FCS or CRC field 319 serves as an error check code for the data packet. As recognized in the art, each data packet needs to have its own unique CRC field 152 in order to accurately detect any errors in the received data frame.

The tagged frame $3_2$ includes the DA data 311, the SA data 313, the MAC length/type data 315 and the actual user data 317 from the untagged frame $3_1$. However, the VLAN processing by the NIC, to transmit the frame 3, requires the addition of a VLAN tag 330 following the SA field 311.

Figure 4:
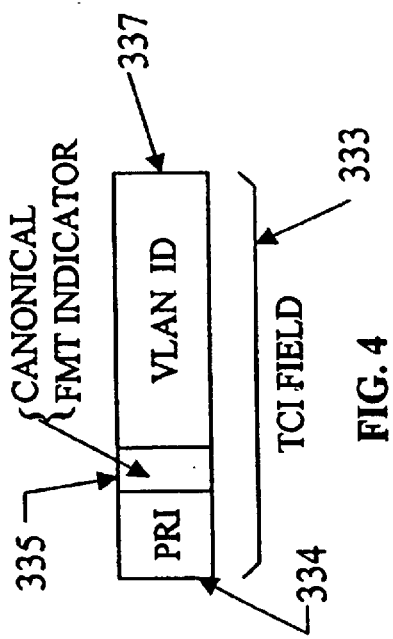
FIG. 4 is a diagram illustrating the contents of the TCI field of modified frame of FIG. 3.

The VLAN tag includes a 2-byte length/type field 331 and a 2-byte TCI field 333 for tag control information. A hexadecimal value of 8100 in the length/type field 331 indicates that the four bytes following the SA field 313 represent a VLAN tag. As shown in FIG. 4, the TCI field 333 contains three components. The TCI field contains a 3-bit of priority indicator (PRI) 334 followed by a 1-bit canonical format indicator 335. The canonical format indicator 335 typically is 0 for Ethernet switches. The other twelve bits 337 of the TCI field 333 contain an identifier for the particular VLAN. If the frame was coming from or going to one of the devices 13, 15 or 17, in the example shown in FIG. 1, the VLAN ID field 337 would contain the 12-bit identifier assigned to the red VLAN 19.

Since the information of the frame 3 changed by the addition of the tag 330, the NIC also must calculate a new CRC value for the frame 3 and replace the original value from the FCS field 319 with the new value in the field 339. As a result, the NIC 25 will effectively convert the untagged frame $3_1$ to the tagged frame $3_2$, complete with a new FCS field, as the NIC reads the frame from the transmit buffer and sends the frame over the network media.

To facilitate the requisite VLAN tag processing within the NIC hardware, the present invention entails passing certain VLAN tag information in the buffer descriptors. In this regard, the invention utilizes specific formats for the descriptors, which include fields for the VLAN tag information. Preferred embodiments of the descriptor formats appear in FIGS. 5 and 6.

Figure 5:
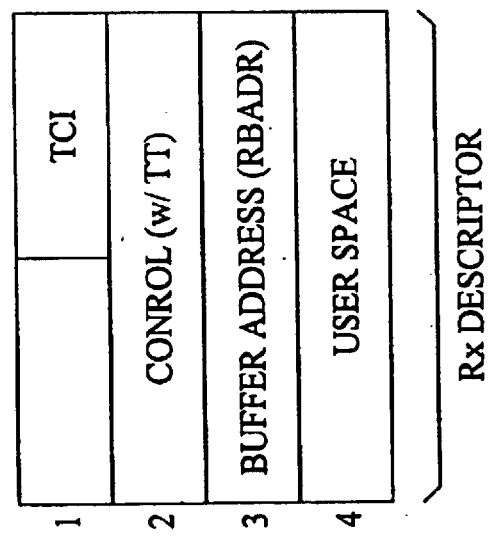
FIG. 5 is a diagram of a receive (Rx) descriptor for use in the inventive VLAN tag processing.

FIG. 5 depicts the presently preferred format of a receive (Rx) descriptor, used in the inventive VLAN tag processing. As shown, the inventive descriptor includes four 32-bit (4-byte) DWords. The first DWord includes the two bytes of TCI data, corresponding to the TCI field 333 of a VLAN tag. The second DWord contains various control information, such as the OWN bit. For purposes of this discussion, two bits of the control DWord represent the Tag Type (TT). The third DWord contains the actual pointer to the assigned receive (Rx) buffer, that is to say the receiver buffer address (RBADR). The last DWord of the receiver descriptor is available for user space.

As noted, the third control DWord includes a TT (tag type) field identifying the type of frame received. The value of this 2-bit indicator, for example, signifies whether or not a received frame includes a VLAN tag and/or the priority of that tag. In a preferred embodiment, the binary values of the TT field represent tag types, as follows:

00=reserved;
01=frame untagged;
10=frame is priority tagged; and
11=frame is VLAN tagged.

A priority tag status in the TT field means the frame has a VLAN tag but with VLAN ID field of all 0s. The priority field in the TCI can also specify priority.

Figure 6:
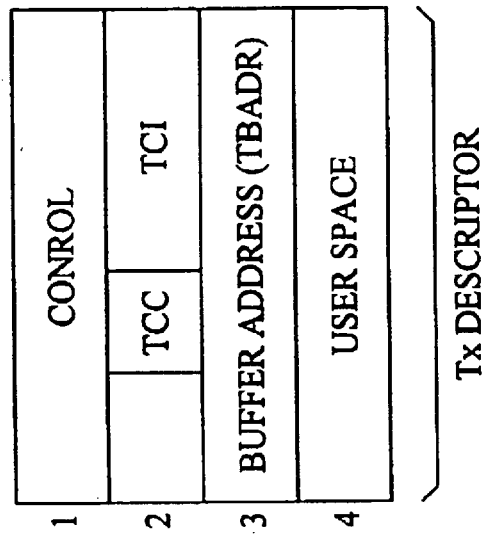
FIG. 6 is a diagram of a transmit (Tx) descriptor for use in the inventive VLAN tag processing.

FIG. 6 shows the presently preferred format of a transmit (Tx) descriptor, used in the inventive VLAN tag processing. In this descriptor, the first DWord contains various control information, such as the OWN bit, and the byte count indicating the frame length or number of bytes to be transmitted. Recall that the OWN bit indicates which element (CPU or NIC controller) owns the descriptor. For example, a 1 in the OWN bit means that the NIC controller owns the buffer. If the buffer is a receive buffer at the time, the buffer is available for loading by the NIC controller. If the buffer is currently serving as a transmit buffer, the 1 value means that the frame in the buffer is ready to send. The transmitting NIC will sequentially process and send frames for descriptors having the 1 in the OWN bit until it reaches a descriptor having an OWN bit of 0.

The third DWord of the transmit (Tx) descriptor contains the actual pointer to the assigned transmit (Tx) buffer, that is to say the transmit buffer address (TBADR) for the memory location containing the frame that is ready for transmission. The last DWord of the transmit (Tx) descriptor is available for user space.

In accord with the invention, the second DWord has been added to the (Tx) descriptor to facilitate processing of the VLAN tag during transmit processing in the hardware of the NIC. The second DWord provides the VLAN processing instruction for the transmitting operation of the NIC. Specifically, the second DWord contains a 2-bit Tag Control Command (TCC) followed by the two bytes of TCI data, corresponding to the TCI field 333 of a VLAN tag. In this example, 14 bits in the second DWord of the transmit (Tx) descriptor are unused.

The value of the TCC command bits indicates whether the NIC is to add, delete or modify a VLAN tag or pass the frame without modification regarding the tag. In a preferred embodiment, the binary values of the TCC represent instructions as follows:

00=transmit data unaltered;
01=delete tag header;

10=insert tag header with TCI data from descriptor; and
11=replace existing TCI field with TCI data from descriptor.

When a NIC 25 receives a frame, the Ethernet controller 251 parses the frame to determine if the frame has a VLAN tag. If so, the Ethernet controller 251 copies the TCI field of the tag into the receive descriptor, unless the NIC detects priority. Consequently, the switch software can easily retrieve that value for further processing. The CPU does not need to read the TCI value from the frame in the buffer memory. The controller 251 also writes the tag type data into the appropriate DWord in the receive descriptor, such that if the frame is VLAN tagged, TT=11.

The operations involved in VLAN tag processing during NIC transmission of a frame are particularly significant and merit a more detailed discussion at this point. For a frame transmission, the logic implemented by the CPU 21 of the particular switch 11 determines that there is a need to add, modify or delete a VLAN tag. If a frame needs an added tag or a modification of a tag, the CPU logic also determines the information that needs to be included in the tag for the particular frame. As noted in the discussion of the transmit descriptor, the CPU 21 adds the appropriate tag related command TCC and any necessary data into the TCI field, and the NIC controller 251 processes the frame accordingly.

For example, for a tag insert operation, the NIC 25 begins reading the frame $3_1$ from the Tx buffer location in system memory 23 and sending it out over the network link 27. When the NIC 25 reaches the end of the source address field (SA) 313, the NIC inserts the VLAN tag data 330 and sends it out over the network link 27. The NIC 25 then resumes reading the frame $3_1$ from the Tx buffer, starting with the MAC length/type data 315 and then followed by the actual data 317, and it sends this information read from the buffer out over the network link 27. As part of its processing, the NIC 25 also computes a new value for the FCS field 339 and sends that value after the end of the data 317. Consequently, the frame actually transmitted takes the format of the frame $3_2$ shown to the right in FIG. 3.

In certain cases, the switch receives a frame with a VLAN tag with all 0s in the VLAN ID field. In such a case, the switch needs to add the VLAN ID associated with the port through which the switch received the frame. Although the switch need not add space, it does need to write over the 0 ID with the new bits of the correct VLAN ID. In this case, the CPU 21 includes a 'modify' instruction in the tag control command (TCC) and the correct ID in the VLAN ID in the second DWord of the transmit descriptor (FIG. 6). In response to the descriptor, the NIC controller 251 begins reading the frame from the Tx buffer location in system memory and sending it out over the network link. When the controller reaches the tag control information (TCI) 333, the NIC ignores the data from the buffer and sends a TCI field out over the network link that includes the new VLAN ID read from the second DWord of the transmit descriptor. The NIC then resumes reading the frame from the Tx buffer, starting with the MAC length/type data 315 and then followed by the actual data 317, and it sends this information read from the buffer out over the network link. As part of its processing, the NIC computes a new value for the FCS field and sends that value after the end of the data 317.

When the switch receives a frame containing a VLAN tag but needs to forward the frame over a link to devices that do not process the tags, the switch must delete the tag. In accord with the invention, the switch CPU 21 now includes a delete command in the TCC field of the transmit descriptor. In response, the controller will cause the NIC to skip over the VLAN tag information 330 of the frame as the NIC 25 reads the frame from the buffer and transmits the frame over the media 27.

Situations also arise where there is no need to change the frame with regard to the VLAN tag. For example, when a switch receives a tagged frame from one switch and passes the frame on to another switch, there is no need to modify the frame. In such a case, the CPU provides a descriptor containing a tag control command instructing the sending NIC to simply pass the frame.

If the NIC modifies the frame in relation to the VLAN tag, the NIC will always calculate a new value for the FCS field and replace the FCS value from the original frame with the new value. There are some control functions that relate to the FCS operations of the NIC, and in some cases, these control functions may disable FCS generation. However, the VLAN tag processing will override any such controls that might otherwise disable the FCS generation. Hence, in any case in which the NIC 25 modifies the frame in relation to the VLAN tag, the NIC also will recalculate and rewrite the value in the FCS field.

As shown by the above detailed description, the inventive concepts involve VLAN tag processing in the NIC. The CPU logic needs to process the descriptors but not the actual tags. On the receive side, the NIC analyzes the frame with regard to VLAN tags and adds appropriate information to the receive descriptor. On the transmit side, the CPU only forms the appropriate instruction in the descriptor and passes the descriptor to the NIC. The NIC performs the actual VLAN tag processing, for example without any extra transfers or copying of the frame data to different locations in the system memory. This reduces the load on the CPU and the amount of processing performed in the buffers within the system memory.

Although the above discussion has emphasized the application of the inventive VLAN tag processing in a switch, those skilled in the art will recognize that the inventive processing may be implemented in other devices on the network, for example in end-user devices. The VLAN-enhanced controller, for example, could be useful in a host PC or server that transmits and receives tagged frames. A VLAN software module could logically fit between the NIC device driver and the normal LAN software that generates and receives frames. The VLAN module could use the VLAN hardware to insert the appropriate VLAN tag into transmitted frames. On reception, the VLAN software could use the VLAN information in the Rx descriptor to determine whether or not a VLAN tag must be stripped before the frame is passed on to the normal LAN software.

While the inventions have been described in connection with what is presently considered to be the most practical and preferred embodiments, it is to be understood that the inventive concepts are not limited to the disclosed embodiments, but, on the contrary, are intended to cover various modifications and equivalent arrangements included within the spirit and scope of the appended claims.

What is claimed is:

1. A method of processing a frame of data having a header containing address and status information and data in a network interface card of a switch of a data communication network, the method comprising:

receiving the frame from a network link in a network interface card in the switch;

determining tag status of the frame with regard to a virtual local area network (VLAN) tag that may be contained in the header;

recording the tag status of the frame in a descriptor containing an address of an available buffer in a system memory of the switch;

if the tag status of the frame indicates that the frame contains a VLAN tag, copying a VLAN identifier from the VLAN tag in the frame into a predetermined field of the descriptor;

writing the frame into the system memory of the switch at the location corresponding to the address of the available buffer;

modifying the descriptor to indicate to a central processor of the switch that the available buffer has been loaded with a frame corresponding to the descriptor; and processing the frame through the switch from the buffer based at least in part on the tag status recorded in the descriptor.

2. A method as in claim 1, wherein the frame comprises an Ethernet frame.

3. A method as in claim 1, wherein the tag status recorded in the descriptor has a value indicating a type of status selected from the group comprising: tagged, untagged and priority.

4. A method as in claim 1, wherein the step of processing comprises:

developing a transmit descriptor containing the address of the loaded buffer and a VLAN tag command;

forwarding the transmit descriptor to another network interface card in the switch; and transmitting the frame from the loaded buffer and processing the frame header in said another network interface card during transmission in accord with the VLAN tag command.

5. A method as in claim 4, wherein the step of developing a transmit descriptor comprises writing a VLAN identifier into a designated field of the transmit descriptor.

6. A method as in claim 4, wherein the processing of the frame header in said another network interface card during transmission in accord with the VLAN tag command comprises executing one of the following operations, adding a VLAN tag to the header of the frame, deleting a VLAN tag from the header of the frame and modifying a VLAN tag contained in the header of the frame.

7. A method of processing and transmitting a frame containing a header and data over a network link, comprising:

receiving a descriptor in a network interface controller of a network interface card of a switch, the descriptor containing an address for a buffer location in a system memory of the switch where the frame is stored, a virtual local area network (VLAN) tag control command, and a field for VLAN tag control information;

reading the frame from the addressed buffer location and transmitting the frame from the network interface controller of the network interface card of the switch over the network link; and as part of the reading and transmitting operation of the network interface controller of the network interface card of the switch, processing a portion of the header of the frame in accord with the tag control command.

8. A method as in claim 7, wherein if the tag control command includes an instruction to add a VLAN tag to the header, the processing of a portion of the header comprises inserting the VLAN tag control information from the descriptor into the header during the reading and transmitting of the frame.

9. A method as in claim 7, wherein if the tag control command includes an instruction to modify a VLAN tag contained in the header of the frame, the processing of a portion of the header comprises writing the VLAN tag control information from the descriptor over the VLAN tag contained in the header of the frame during the reading and transmitting of the frame.

10. A method as in claim 7, wherein if the tag control command includes a delete instruction, the processing of a portion of the header comprises deleting a VLAN tag contained in the header of the frame during the reading and transmitting of the frame.

11. A method as in claim 7, wherein the frame comprises an Ethernet frame.

12. A method of processing frames through a data switch supporting virtual local networks (VLANs), comprising:

receiving and transmitting frames over network media through network interface cards of the switch;

writing received frames to buffer storage in available buffer locations in a system memory of the switch specified in receive buffer descriptors obtained by the network interface cards from a central processor of the switch;

reading frames for the transmission from buffer storage in buffer locations in the system memory of the switch specified in transmit buffer descriptors communicated from the central processor of the switch to the network interface cards;

passing VLAN tag information in the receive buffer descriptors and in the transmit buffer descriptors; and processing VLAN tags in frames in the network interface cards.

13. A method as in claim 12, wherein the processing comprises analyzing status of a frame received from the media in the network interface cards and indicating a tag type in each of the receive descriptors.

14. A method as in claim 12, wherein the processing comprises altering header information in a plurality of frames during reading and transmission of the plurality of frames, in accord with a tag control command contained in each transmit descriptors corresponding to one of the plurality of frames.

15. A method as in claim 12 further comprising replacing error detection data for each frame having an altered header with error detection data derived from the frame containing the altered header.

16. A network interface card for use in a data switch having system logic and a system memory, comprising:

a network interface controller for coupling to the system logic of the switch;

a physical transceiver coupled to the network interface controller for sending and receiving data from and to the network interface controller as signals over a network media; and random access memory coupled to the network interface controller for storing data frames during transmission and reception processing thereof through the network interface card, wherein the network interface controller is programmed to control the operations of the network interface card so as to execute the following steps:

(a) receiving a data frame from the network media;

(b) determining tag status of the frame with regard to a virtual local area network (VLAN) tag that may be contained in a header of the frame;

(c) recording the tag status of the frame in a descriptor containing an address of an available buffer in the system memory of the switch;

(d) if the tag status of the frame indicates that the frame contains a VLAN tag, copying a VLAN identifier from the VLAN tag in the frame into a predetermined field of the descriptor;

(e) writing the frame into the system memory of the switch at the location corresponding to the address of the available buffer;

(f) modifying the descriptor to indicate to the system logic of the switch that the available buffer has been loaded with a frame corresponding to the descriptor.

17. A network interface card as in claim 16, wherein the network interface controller comprises:

a media independent interface port for communication via the physical transceiver;

a media access controller coupled to the media independent interface port;

a host interface for communication with the logic of the switch;

a memory interface for reading and writing to the random access memory; and a descriptor management unit.

18. A network interface card for use in a data switch having system logic and a system memory, comprising:

a network interface controller for coupling to the system logic of the switch;

a physical transceiver coupled to the network interface controller for sending and receiving data from and to the network interface controller as signals over a network media; and a random access memory coupled to the network interface controller for storing data frames during transmission and reception processing thereof through the network interface card, wherein the network interface controller is programmed to control the operations of the network interface card so as to execute the following steps:

(a) receiving a descriptor from the logic of the switch, the descriptor containing an address for a buffer location in the system memory of the switch where a frame for transmission is stored, a virtual local area network (VLAN) tag control command, and a field for VLAN tag control information;

(b) reading the frame from the addressed buffer location and transmitting the frame over the network media; and (c) as part of the reading and transmitting operation, processing a portion of a header of the frame in accord with the tag control command.

19. A network interface card as in claim 18, wherein the network interface controller comprises:

a media independent interface port for communication via the physical transceiver;

a media access controller coupled to the media independent interface port;

a host interface for communication with the logic of the switch;

a memory interface for reading and writing to the random access memory; and a descriptor management unit.

20. A network interface controller in a network interface card comprising, a host interface for connection to a data switch;

a media interface post, for coupling to a network media;

means coupled to the host interface for receiving a descriptor from logic of the data switch, the descriptor containing an address for a buffer location in a system memory of the data switch where a frame ready for transmission over the network media is stored, a virtual local area network (VLAN) tag control command, and a field for VLAN tag control information; means for reading the frame from the addressed buffer location and transmitting the frame through the media independent interface over the network media, the reading and transmitting operation including processing of a portion of a header of the frame in accord with the tag control command.

* * * * *